3,440,105
LAYER-BUILT DRY BATTERIES
Shohei Yamamoto, Osaka, Jun Watanabe, Kobe, Susumu Hosoi, Osaka, and Masahiro Kuwazaki, Toshikatsu Takata, Naohiro Matsuda, Kizo Hidaka, and Masahisa Nishiguchi, Moriguchi, Japan, assignors to Matsushita Electric Industrial Co., Ltd., Osaka, Japan, a corporation of Japan
Filed Feb. 18, 1966, Ser. No. 528,583
Claims priority application Japan, Feb. 24, 1965, 40/15,210
Int. Cl. H01m 21/06, 17/04, 31/00
U.S. Cl. 136—108                                    10 Claims

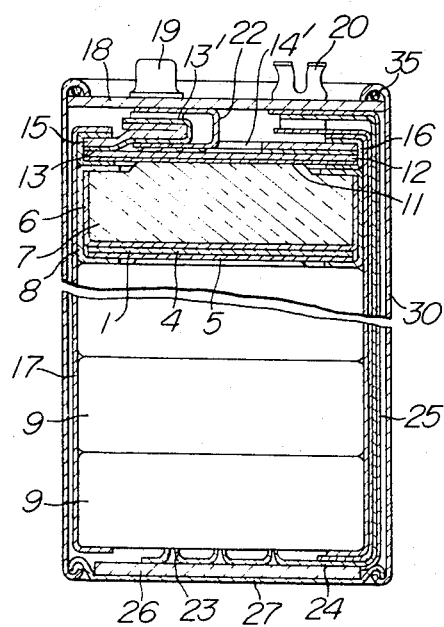
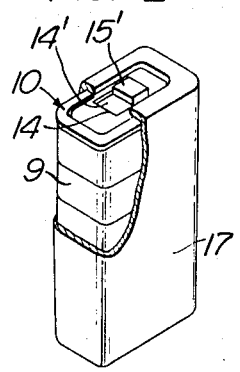
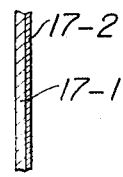
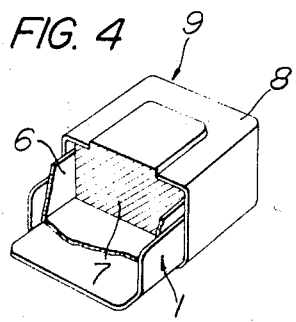
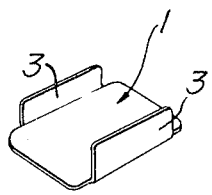
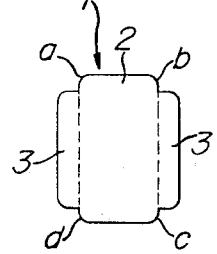

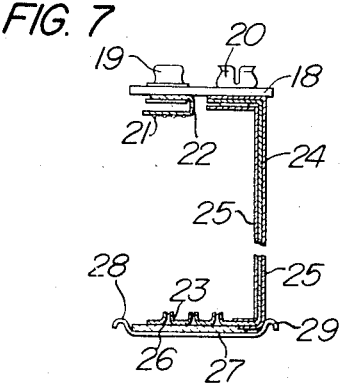
FIG. 7
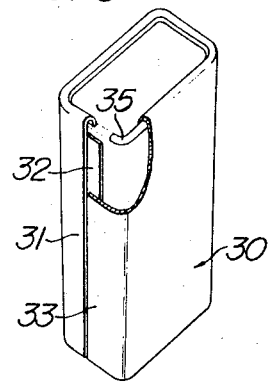
FIG. 8
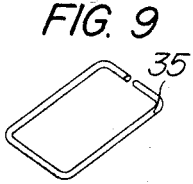
FIG. 9
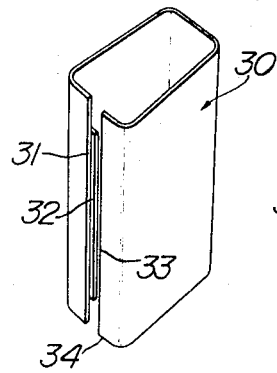
FIG. 10
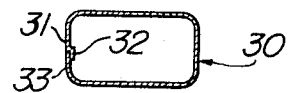
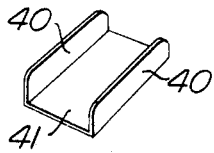
FIG. 11
FIG. 12
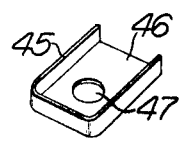
FIG. 13

ABSTRACT OF THE DISCLOSURE

An improved layer-built dry battery wherein the elementary cells include a U-shaped negative electrode coated over its external surface with a carbon film, a paper separator strip and a depolarizer mix, the whole encased in a plastic covering heat shrunk into a U-shaped cross-sectional configuration whereby the reacting surface area of the negative electrode is increased and the amount of depolarizer mix packable in the positive electrode is also increased.

---

This invention relates to improvements in layer-built dry batteries and has for its object to provide a layer-built dry battery which exhibits high performance characteristics under any discharge conditions including light and heavy loads.

More specifically, the present invention is designed simultaneously to meet the two requirements of increasing the reacting surface area of the negative electrode and increasing the amount of depolarizer packable in the positive electrode particularly by use of a zinc negative electrode having rising portions along its two opposite side edges.

Another object of the present invention is to increase the quantity of cell elements packable in the outer shell or jacket eliminating any inwardly raised seam conventionally formed on the inside thereof.

A further object of the present invention is to improve the mode of connection between the positive and negative electrodes of the cell stack, on one hand, and the positive and negative electrode terminals fixed to the terminal strip, on the other hand, so as to make the electrical connection simple and reliable while eliminating the need of binding the cell stack by tape means and of soldering the lead strips, thereby to enable increase in height of the cell stack and hence in capacity of the battery.

For a better understanding of the present invention, some description will first be made on conventional layer-built dry batteries. With increasing demand for and expanding use of layer-built dry batteries, there is now a particular request for those capable to discharge on light and heavy loads. A progress recently made in this direction is the use of highly active electrolytic manganese dioxide in place of conventional natural manganese dioxide and it has commonly been thought difficult to realize a battery of the kind described which exhibits any higher performance.

From the structural viewpoint, the zinc negative electrode is planar and its size is determined by the dimensions of the final product. Besides, the output of a cell depends upon the reaction area of the negative electrode. Under these circumstances, it has been theoretically unreasonable to expect any further improvement in battery performance, particularly in operating characteristic on heavy loads.

Various attempts have previously been made in an effort to increase the reacting area of the zinc negative electrode even to a slight extent. In one attempt, an unbound type stack formation has been proposed to eliminate any pressboards, plastic bands, hemp yarns or other means conventionally used to clamp or bind the cell stack thereby to extend the planar zinc negative electrodes both lengthwise and widthwise. In another attempt, a seamless outer outer shell or jacket has been employed which carries no inwardly raised seams inside. In these attempts, however, though the planar zinc electrode has been extended in its plane, the increase in area of such negative electrode could not be expected to exceed 10%.

To overcome this situation, a proposal has been made to employ a zinc electrode not in a planar form but in a solid or three-dimensional form. For example, a planar zinc sheet can be worked into a dish, box, cup or like form with rising sides, as by deep-drawing. The formation of such rising sides on a negative electrode can only be effectively utilized by arranging the tamped depolarizer cake and the zinc negative electrode in a manner so that they are held in close contact with each other not only at their bottom but also about their periphery along the four sides of the depolarizer and the adjacent four rising portions of the negative electrode to cause the entire internal surface of the latter to participate in the cell chemistry. It has been difficult in practice, however, to insert the cathode depolarizer in the dished or like negative electrode in closely contacting relation thereto. In addition, the formation of four rising sides on the negative electrode causes decrease in quantity of the depolarizer to that extent. Moreover, during the deep-drawing process, it occurs that the electrically conductive carbon film previously coated on one surface of the zinc sheet is separated therefrom. When assembled into a battery, such sheet should cause shortcircuiting and this has precluded partical use of such cell structure.

In an attempt to cope with this situation, a zinc negative electrode dished or otherwise formed by deep-drawing and carrying no carbon film has been placed on a common planar zinc sheet. The zinc negative electrode of this structure has an increased surface area favorable for discharging on heavy loads but the two-fold arrangement of zinc sheet naturally results in reduction in amount of the packed cathode depolarizer, impairing the cell performance on light loads. In addition, with the negative electrode structure including double zinc sheet, it has been found that the electrolyte entering into the space between the zinc sheets causes corrosion thereof and hence increase in internal resistance and reduction in shelf life of the battery.

Another approach to the problem previously tried by the inventors has been to form a zinc electrode having four rising sides by first slotting the four corners of a zinc sheet and then bending its four sides vertically upward. The zinc electrode thus formed has involved the same deficiencies as those in the dished one described above: including the difficulty in insertion of the cathode depolarizer cake, reduction in amount of the cathode depolarizer packed, and inappropriateness for discharging on light loads.

Other attempts previously made include hot-drawing of a zinc sheet carrying a conductive film of carbon, attaching a carbon film to a zinc sheet after it has been worked into a dish, box or cup form, or bending the sheet into varying dimensions and configurations. In any of these attempts, it has been impossible to obtain a battery with its discharge performance raised by 20% or over because of the increased internal resistance, nonuniform reaction at the zinc negative electrode, and difficulties in actual applications.

Next, concerning the cathode depolarizer, the size of which is determined by the dimensions of the product battery, various attempts have also been made to increase the amount of depolarizer usable to any possible extent. As with the case of the zinc negative electrode, the cathode depolarizer can be extended both lengthwise and widthwise by use of the unbound type stack formation and/or the seamless outer shell. By this measure, however, only an increase in amount of depolarizer of 8% or less can be expected. One attempt to overcome this limitation has been to do away with the soldering procedure, commonly followed to ensure connection between the battery terminals and lead wires, in order to allow local increase in height or thickness of the depolarizer. This attempt, has, however, been impractical because it makes the connection between the terminals and lead wires unstable and a miscontact frequently occurs due to expansion and contraction during discharge or storage. This approach to the problem of increasing the quantity of depolarizer packable in the positive electrode will be considerably promising only if the contact problem be solved, as will be described hereinafter in connection with the embodiments of the present invention.

Other attempts have included reduction in thickness of the terminal mounting and bottom plates and removal of gap-adjusting paper sheets. Neither of these measures, however, could improve the discharging performance of the battery to any extent exceeding 5% because of the restrictions from the standpoints of physical strengths and process control. A further means previously proposed to increase the quantity of the depolarizer has been to employ a higher tamping pressure to increase the amount of depolarizer tamped in unit volume. This method has enabled a maximum increase of 20% but has been impractical since the tamping machine often gets out of order, wearing rapidly, and since the amount of depolarizer packed varies with the moisture content of the depolarizer when tamped.

Having described the important problems involved in the conventional procedures and attempts previously made by the inventors, it will now be apparent that it has been difficult with any previous techniques simultaneously to increase the amount of the depolarizer and the reacting area of the zinc negative electrode thereby to obtain a layer-built dry battery capable of discharging on both light and heavy loads with satisfactory performance characteristics. In other words, though for discharging on light loads it is possible to improve the battery performance proportionally by increasing the amount of cathode depolarizer packed, as clearly shown in Table 1, it is prerequisite for any high performance on heavy loads to increase the reacting surface area of the zinc negative electrode without reducing the amount of the cathode depolarizer.

TABLE 1.—AMOUNT OF DEPOLARIZER AND DISCHARGING CHARACTERISTIC

| | Load resistance | Depolarizer | | | |
|---|---|---|---|---|---|
| | | 100 | 200 | 300 | 400 |
| Light load | 1,500Ω | 100 | 235 | 330 | 421 |
| Heavy load | 450Ω | 100 | 170 | 260 | 300 |

Discharging was effected for each of the resistances on an intermittent basis of 4 hours a day and 6 days a week. The discharging characteristic indicated corresponds to the percentage ratio of the total hours of discharge to 5.4 volts to the value obtainable with the reference amount of depolarizer.

Next, convention layer-built dry batteries will be explained particularly in connection with their standards and use. For instance, the performance of 6F22 type batteries was initially indicated according to the ASA Standard (1959) by the total hours of intermittent service of 4 hours per day on a load of 166.7Ω per cell for a final voltage of 0.9 volt per cell, and according to the IEC Standard (1965) is indicated by the total service hours operating 4 hours per day on a load of 150Ω per cell for the same final voltage of 0.9 volt per cell. This indicates a pronounced trend to heavier load discharging. On the other hand, transistor radios designed to employ the 6F22 type battery initially exhibited a current consumption ranging from 5 ma. to 10 ma., requiring a minimum voltage of the order of 3.5 volts for audible reproduction, and thus were operable satisfactorily with previous battery performances.

Recently, however, as the senses of radio listeners to the tone quality grow keener, the FM broadcast has been put into operation and radio receivers excelling in tone quality have been developed. They generally exhibit a current consumption ranging from 20 ma. to 40 ma. and require a minimum voltage of 4.5 volts or higher for audible reproduction. Also, the range of battery application has been extended to include tranceivers, toys, wireless mikes and others, all exhibiting a substantially high current consumption, and is being further developed making it necessary to produce layer-built dry batteries improved over the conventional ones, which have been capable of furnishing a high voltage but weak in heavy load discharging.

The present invention is intended to provide a layer-built dry battery which is appropriate for both light and heavy load discharging, overcoming the deficiencies involved in conventional layer-built dry batteries, which have been inappropriate for heavy load discharging though appropriate for light load discharging, as pointed out hereinbefore.

The above and other objects, features, and advantages of the present invention will become apparent from the following description when taken in conjunction with the accompanying drawings, which illustrate a few embodiments of the invention and in which:

FIG. 1 is a fragmentary cross-sectional elevation of a 6F22 type layer-built dry battery embodying the present invention;

FIG. 2 is a partly cutaway perspective view of the battery illustrating the manner in which the elementary cells and the positive collector assembly are bound together;

FIG. 3 is a fragmentary cross section of the binding structure;

FIG. 4 is a partly cutaway perspective view of one of the elementary cells;

FIG. 5 is a perspective view of the zinc negative electrode of the elementary cell shown in FIG. 4;

FIG. 6 illustrates the zinc electrode in development;

FIG. 7 is a fragmentary cross section illustrating the manner in which the positive and negative lead strips are secured to the terminal mounting plate;

FIG. 8 is a partially cutaway perspective of the outer shell;

FIG. 9 is a perspective of the support frame of the outer shell;

FIG. 10 represents a perspective and a cross-sectional view of the outer shell body;

FIG. 11 is a perspective view of another form of zinc negative electrode;

FIGS. 12 and 13 illustrate respective further forms of support frame of the outer shell;

Figure 19:
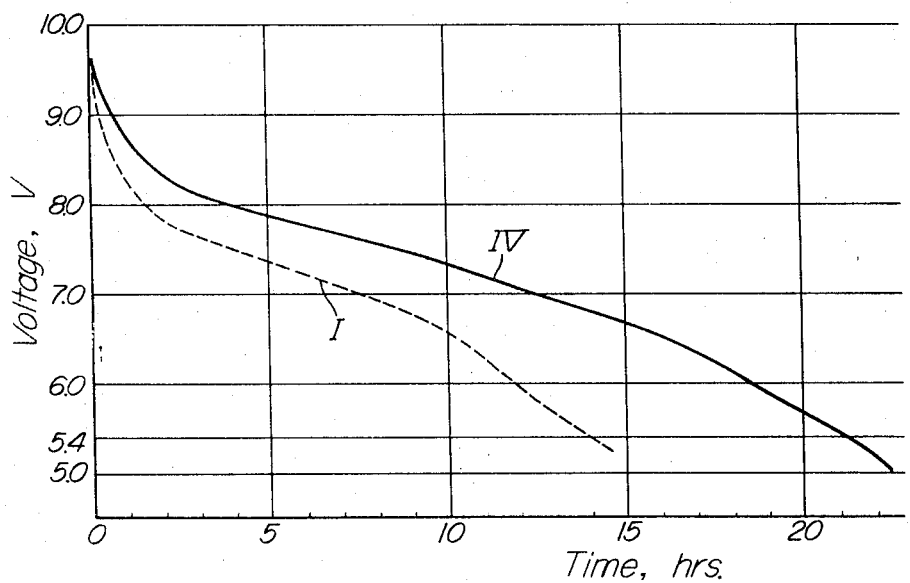
Figure 20:
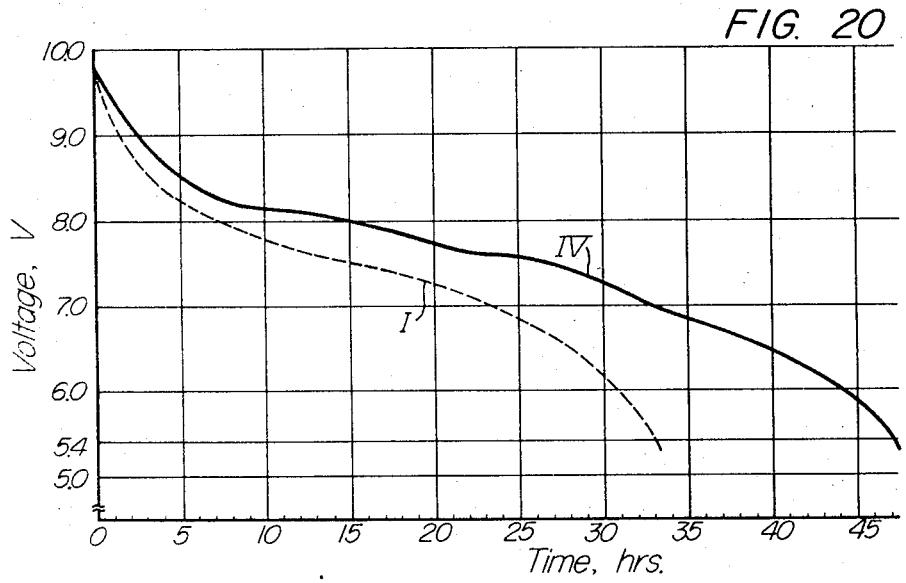
Figure 21:
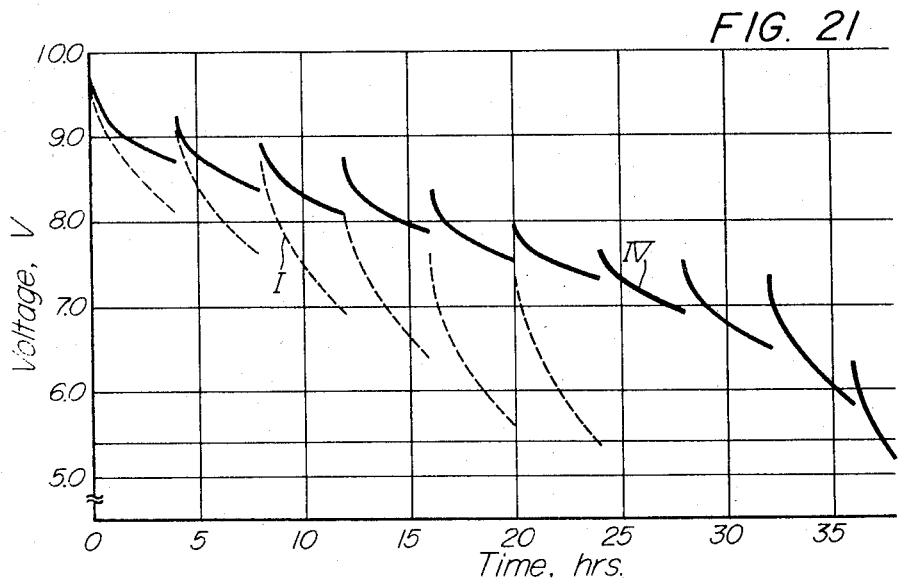

FIGS. 19, 20 and 21 graphically illustrate the discharging characteristic of the inventive layer-built dry battery in comparison with that of the conventional one.

Referring to the drawings, the reference numeral 1 indicates a combined carbon-zinc electrode plate, which is formed of a zinc sheet 4 with a conductive carbon film 5 coated on its underside by punching a shape of such sheet consisting, as shown in FIG. 6, of a body portion 2 having four arcuate corners $a$, $b$, $c$ and $d$ and integral side extensions 3 extending along the longitudinal edges of the body portion 2 except its opposite ends and bending the side extensions 3 upwardly by appropriate jig means to obtain a U-shaped cross section as shown in FIG. 5. Reference numeral 6 indicates a separator sheet of water-absorbent kraft paper carrying a coat of starch on its outer surface. Reference numeral 7 indicates a protuberant pressure-tamping of cathode mix including electrolytic manganese dioxide and acetylene soot as main ingredients; and 8 indicates a cell covering comprising a tube of heat-shrinking plastic such as polyvinyl chloride. Referring to FIG. 4, the elementary cell 9 is obtainable by the following procedure. At first, combined carbon-zinc electrode plate 1, coated along its bottom periphery with an adhesive agent, is inserted in the tube 8, the bottom edges of which is then heated to shrink into adhesive contact with the bottom peripheral portion of the electrode plate 1. Subsequently, after the electrolyte chiefly composed of sal ammoniac and zinc chloride has been poured in the tube, the cathode cake 7 wrapped with separator sheet 6 is inserted therein and finally the top edges of the tube 8 is heated to shrink close to the top peripheral portion of the cathode cake 7.

Reference numeral 10 indicates a positive collector assembly which includes a collector plate, for example, in the form of a zinc sheet 12 carrying a coat of carbon film on its underside, an insulating sheet of paper 15 carrying a conductive metal foil 13 as of aluminum adhesively secured to its underside and centrally formed with a U-shaped slit 14, and a polyvinyl chloride tube 16 closely covering the collector plate 12 and insulating sheet 15 along the peripheral edge thereof to form an integral assembly with the slitted portion 14 of said insulating sheet 15 and aluminum foil 13 folded upward and back into contact with the adjacent top portion of the insulating sheet, as indicated at 15' in FIG. 2.

A number of such elementary cells 9 are stacked one on another in series connection with the top portion of the cathode cake 7 of each cell placed in electrical contact with the underside of the electrode plate 1 of the adjacent overlying cell. For example, 6F22 type layer-built dry batteries include a stack of six elementary cells. Placed on the top of the cell stack is the positive collector 10 with its collector plate 12 in contact with the cathode cake 7 in the topmost cell.

The stacked assembly of the elementary cells 9 and positive collector 10 is dipped in a bath of molten wax to form a wax film 17–1 on the sides and top and bottom peripheral portions of the assembly. The stack thus coated with wax is then covered with a heat-shrinking plastic tube such as a polyvinyl chloride tube 17–2, which is then heated to shrink closely over the wax film 17–1. In this manner, the elementary cells 9 are sealed liquid-tight and bound together with the positive collector 10 into an integral unit (FIG. 2).

Referring particularly to FIG. 7, reference numeral 18 indicates a terminal mounting plate of hard synthetic resin carrying positive 19 and negative 20 terminals fixed thereto. A positive lead strip 22 formed adjacent to its one end with projections 21 and a negative lead strip 24 formed adjacent to its one end with projections 23 are firmly secured to the underside of the terminal mounting plate 18 by caulking the positive and negative terminals 19 and 20, respectively. The negative lead strip 24 is covered by an insulating sheet of paper 25 and an insulator plate 26 is adhesively secured to that side of the lead strip opposite to the projections 23. Reference numeral 27 indicates a metal bottom plate having peripheral edges bent in an inverted U-shaped cross-section so as to form on the top side a recess 28 to snugly receive said insulator plate 26 while forming a bottom flange 29 extending downwardly along the periphery of the bottom plate.

Referring to FIGS. 8 to 10, the outer shell or jacket 30 of the battery shown in FIG. 1 is a prismatic tube of metal sheet formed by bending the latter so that its opposite side edges 31 and 33 are brought into abutting engagement with each other. One of the side edges 31 carries an inwardly offset lap 32 extending short of the top and bottom ends thereof while the other edge 33 is formed at its bottom end with a notch 34. The top edge of the shell is bent about the support frame 35 of steel wire to be kept from expanding radially outwardly.

In assembling this battery, the terminal mounting plate 18 is placed on the stack of cells 9 and positive collector 10 in contacting engagement with the collector plate 12 and the end portion of positive lead strip 22 carrying projections 21 is inserted between the insulating sheet of paper 15 and aluminum foil 13 through the opening 14' left therein after the folding back of the slitted sheet portion 14. The exposed aluminum foil 13' on the folded sheet portion 15' is thus placed in contact with the bottom end of the positive terminal 19. The negative lead strip 24 is bent so that the projections 23 formed thereon is in contact with the bottom surface of the electrode plate 1 of the lowermost cell.

Then, the recessed top 28 of the bottom plate 27 is fitted over the insulator plate 26, which is adhesively secured to the bottom portion of the negative lead strip 24. The assembly thus formed is inserted into the shell 30 through its bottom opening and the lower edge of the shell is bent inward to closely embrace the peripheral flange 29 formed on the bottom plate 27.

In the layer-built dry battery assembled in this manner, it will be understood that the electrical connection between the positive electrode of the cell stack and the positive terminal 19 of the battery is effected through the positive collector 10 and positive lead strip 22. Also, since the extreme portion of the positive lead strip 22 fixed to the positive terminal 19 is inserted through the opening 14' in the insulating sheet 15 into the interstice between the sheet and the positive collector plate 12 to keep contact with the latter while the aluminum foil 13 coated on the insulating sheet 15 is, for the most part, held in contact with the collector plate 12 with the folded foil portion 13' held in contact with the bottom end of the positive terminal 19 and since the contacting components are closely held together in the vertical direction by the clamping effect of the outer jacket 30, the electrical contacting relation between the positive terminal 19 and positive collector plate 12 is at all times kept satisfactory on account of the folded portion 13' of the aluminum foil 13 irrespective of the expansion and contraction of the battery cells which may cause contact failure between the positive lead strip 22 and collector plate 12.

This makes it unnecessary to bind together the elementary cells and positive collector by tape or like means or to connect the positive lead strip with the collector plate by soldering. Thus, the need of using gap-adjusting sheet or other means to accommodate the irregularities in profile is completely eliminated, allowing more or less increase in quantity of the cell elements accommodatable in the outer jacket of a predetermined size.

Another advantage of this battery structure is that the outer shell 30 is effectively kept against radially outward expansion since the side edges 31 and 33 of the shell are held in overlapping engagement and the top and bottom edge portions are bent inwardly to engage the inner periphery of the rectangular support frame 35 and the peripheral flange 29 on the bottom plate 27, respectively, so that any force acting upon the shell in a direction to expand the latter radially outwardly, for example, the resilience of the shell-forming sheet tending to restore its initial flat shape or the gas pressure taking place in the battery during its use, is effectively sustained by the steel frame 35 and the flanged formation 29. The inwardly offset lap 32 extending along one side edge 31 of the shell-forming sheet is held against outward movement relative to the adjacent side edge 33, which lies in overlapping engagement with the offset extension 32, and thus the two side edges 31 and 33 are at all times effectively held in abutting engagement with each other.

Figure 17:
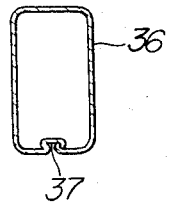
FIG. 17 is a transverse cross section of a conventional outer shell.

This abutting edge structure is in marked contrast to the rolled-seam structure 37 of the conventional outer shell 36 shown in FIG. 17 in cross section. Compared to the conventional seam 37, which is inwardly heavily raised, the abutting edge structure according to the invention is practically seamless, having a thickness only twice that of the shell-forming sheet, and enables a corresponding increase in quantity of the cell elements accommodatable in the shell of the same outer diameter.

Investigations have been performed to see to what extent that battery performance can be improved by the novel connection between the cell stack and the terminal structure and of the novel seamless outer shell.

First, comparison was made between a conventional 6F22 type battery (I) and a battery of improved construction (II) for their discharging characteristic, as shown in Table 2.

TABLE 2.—DISCHARGE CONDITIONS

| Battery model | Intermittent discharge, 450Ω, 2 hrs./day | Intermittent discharge, 900Ω, 4 hrs./day | Intermittent discharge, 1,500Ω, 4 hrs./day |
| --- | --- | --- | --- |
| I | 14 hrs | 33 hrs | 65 hrs |
| II | 16 hrs | 40 hrs | 81.5 hrs |
| Percent increase | 15 | 21 | 25 |

Figure 15:
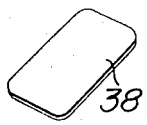
FIG. 15 is a perspective showing a typical conventional zinc negative electrode.

The conventional battery (I) included a planar zinc negative electrode 38, as shown in FIG. 15, an outer shell 36 as shown in FIG. 17 and an electrical connection of the cell stack with the terminal structure through the intermediary of soldered lead wires. The model (II) also employed a planar zinc negative electrode but included a seamless outer shell and a novel mode of connection between the cell stack and the terminal structure according to the present invention. In this comparison test, the discharging performance is represented by the total discharging hours obtained before the final voltage of 5.4 volts is reached. Compared to the reference battery (I), the model (II) included a 12% increase in surface area of the zinc negative electrode and 25% increase in weight of the cathode mix.

As observed from Table 2, the model (II) of improved construction but conventionally employing a planar zinc electrode exhibited only a 15% increase in heavy-load discharging capacity (for 450Ω load).

Figure 16:
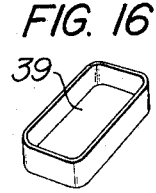
FIG. 16 is a perspective showing another conventional form of zinc negative electrode.

Another comparison test was conducted between a third model (III) employing a zinc negative electrode 39 having four rising sides as shown in FIG. 16 and otherwise similar to the model (II) and a fourth model (IV) employing an electrode 1 shown in FIG. 5 for their discharging performance. Table 3 shows the amount of cathode mix and the area of the reacting surface of the zinc electrode for each elementary cell of the different battery models tested.

TABLE 3

| Battery model | Amount of cathode mix | Reaction area of negative electrode |
| --- | --- | --- |
| I | 2.15 gr | 2.62 cm.² |
| III | 1.90 gr | 5.10 cm.² |
| Percent increase | −12 | 91 |
| IV | 2.80 gr | 4.02 cm.² |
| Percent increase | 30 | 53 |

Fresh batteries of these models when tested under specified conditions exhibited the total discharging hours shown in Table 4 for a final voltage of 5.4 volts at 20° C.

TABLE 4

| Battery model | 24 ma. constant current continuous discharge | 225Ω, 2 hrs./day intermittent discharge | 450Ω, 2 hrs./day intermittent discharge | 900Ω, 4 hrs./day intermittent discharge | 1,500Ω, 4 hrs./day intermittent discharge |
| --- | --- | --- | --- | --- | --- |
| I | 190 min | 252 min | 14 hrs | 33 hrs | 65 hrs |
| III | | 305 min | 16 hrs | 33 hrs | |
| Percent increase | | 21 | 14 | 0 | |
| IV | 366 min | 408 min | 21 hrs | 47 hrs | 81 hrs |
| Percent increase | 92 | 62 | 50 | 42 | 40 |

Tables 3 and 4 show that the performance characteristic of the battery of Model III which includes a zinc electrode having four rising sides as shown in FIG. 16 is enhanced for heavy-load discharging to a more or less extent as the reaction area of the negative electrode is increased but is lowered as the load grows light because of the reduced amount of the cathode mix.

FIG. 19 graphically illustrates the operating characteristics obtained with the battery models (I) and (IV) on intermittent discharge of 2 hrs./day on a 450-Ω load at 20 C. while FIG. 20 illustrates those characteristics obtained on intermittent discharge of 4 hrs./day on a 900-Ω load at 2° C. The curves plotted the closed-circuit voltage at the end of each discharge period.

Table 5 shows comparison between the avaliable discharging hours obtained with the battery models (I) and (IV), when used as a power supply source for a transistor radio, on intermittent discharge of 4 hrs./day to the same final voltage of 5.4 volts at 20° C.

TABLE 5.—TYPE OF RADIO

| Battery model | RF-810 | R-130 | R-108N |
| --- | --- | --- | --- |
| I | 24 hrs | 24 hrs | 23 hrs |
| IV | 37 hrs | 37 hrs | 35 hrs |
| Percent increase | 54 | 54 | 52 |

FIG. 21 illustrates the discharge characteristics of the models (I) and (IV) when used with RF-810 radios.

It will be observed from the above test results that the battery model (IV) embodying the present invention exhibits an excellent performance on both heavy- and light-load discharging.

It is indicated that the zinc negative electrode may take the form of an electrode plate 41 having rising sides 40 along its two opposite side edges, as shown in FIG. 11. Such electrode structure, however, involves the danger that when the elementary cells are inserted in the outer shell or jacket the angular corners of the electrode plate may cause damage to the coverings on the cells or cell stack. Therefore, such electrode plate cannot be extended lengthwise to the full extent of the elementary cell and thus can only have an effective electrode area somewhat smaller than that of the one shown in FIG. 5.

According to the present invention, it will be appreciated from the foregoing that a layer-built dry battery can be provided which is not only capable of heavy-load discharging but also exhibits an excellent performance on light-load discharging by the use of a zinc negative electrode having rising portions along its two opposite side edges, which is effective to increase the reaction area of the negative electrode without decreasing the amount of cathode mix.

In view of the recent increase in demand for low-voltage layer-built dry batteries, it is also expected that the negative electrode structure, including rising sides 3, effective to give an increased reaction area, will increasingly prove its merits for heavy-load discharging. For example, a 6-volt battery including a 4-cell stack has a height per cell larger than that of the 6F22 type 9-volt battery, which includes a 6-cell stack, so that an extremely large increase in anode reaction area can be expected with the 4-cell stack battery by the use of a electrode plate 1 having rising sides 3.

Figure 18:
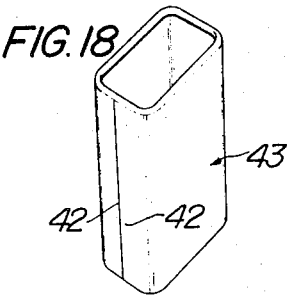
FIG. 18 is a perspective showing another conventional form of outer shell.

Next, the seamless outer jacket used in the embodiments shown will be further described. Conventional outer jackets have usually had adjoining edges overlapped and inwardly rolled to form an inwardly heavily raised seam as illustrated in FIG. 17 and described hereinbefore. In one of previous attempts to obviate such bulky seam structure, an outer jacket 43 has been proposed which has adjacent side edges 42 not overlapping each other but simply brought into abutting engagement with each other, as shown in FIG. 18, and seems to have attained the purpose to some extent. The proposed outer jacket, however, has involved a deficiency that it can hardly maintain its specified diametral dimensions since the abutting edges are outwardly expanded by degrees under the resilience of the jacket sheet tending to restore its original planar form or under the internal pressure of gases evolving during use of the battery owing to the jacket design intended to maintain its prismatic form simply by the inward folding of the top and bottom edges of the jacket.

According to the present invention, this difficulty is effectively overcome by inwardly bending the top and bottom jacket edges to embrace a rectangular support frame 35 and a peripheral flange 29 formed on the bottom plate 27, respectively, and at the same time forming an overlapping extension 32 along one of the adjoining edges 31 of the jacket sheet.

Table 6 shows the results of jacket tests conducted with a battery (V) employing an outer jacket of the type shown in FIG. 18 and another battery (VI) employing a jacket of the type shown in FIG. 8.

TABLE 6

| Battery model | Percent rejection during battery assembling | Percent rejection when short-circuited |
| --- | --- | --- |
| V | 20 | 15 |
| VI | 3 | 0 |

In the above table, the expression "percent rejection during battery assemblying" represents the percentage ratio of the number of batteries rejected during the process of bending the bottom edge of the outer jacket around the peripheral edge of the bottom plate on account of the diametral dimensions of the jacket failing to meet the standards therefor, for example, due to separation, overlapping or outward expansion of the adjoining abutting edges to the total number of batteries tested. The expression "percent rejection when short-circuited" means the percentage ratio of the number of batteries rejected on account of their diametral dimensions failing to meet the standards therefor due to expansion or other deformation of the jacket occurring when left to stand for 24 hours after 24-hour short-circuiting to the total number of batteries tested.

In this connection, it is to be noted that the support frame for the outer jacket need not necessarily be shaped rectangular as indicated by 35 in FIG. 9 but may be U-shaped as indicated by 44 in FIG. 12. In this case, however, it is necessary to engage that side of the outer jacket including the abutting edges 31 and 33 about the central or bottom side of the U-shaped frame and the other two jacket sides about the respective legs of the frame. Alternatively, the terminal mounting plate 18 may be formed along its top periphery with a flange or recess so that the top edge of the outer jacket may be bent to engage such flange or recess. Also, use may be made of a support plate 46 having rising sides 45 along its three edges and secured to the terminal mounting plate 18, for example, by extending the positive terminal 19 through an aperture 47 formed in the support plate 46 so that the top edge of the outer jacket may be bent about the rising sides 45 of the plate 46.

Figure 14:
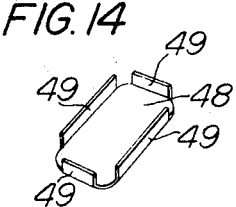
FIG. 14 is a perspcetive showing another form of the bottom plate.

In these cases, where the top edge of the outer jacket is bent to firmly engage the periphery of terminal mounting plate 18 or support plate 46 secured thereto, a support frame such as shown in FIG. 12 may be employed in place of the peripheral flanged formation of the bottom plate 27. Incidentally, the recessed formation 28 of the top plate 27 is intended to maximize the quantity of cell elements accommodatable in the same size of outer jacket. It will be apparent, however, that such recessed formation 28 is not necessarily required and that the bottom plate may be made flat including edge lugs 49 formed along the bottom periphery of the plate separately from each other, as shown in FIG. 14.

Table 7 shows the results of contact tests conducted with two models of battery, one (VIII) including the positive collector and lead strip connected by the novel method described hereinbefore and the other (VII) conventionally including a positive collector held in contact with a lead strip through a single contact point.

TABLE 7

| Battery model | Newly made | Stored 6 months at room temperature | Stored 12 months at room temperature | Stored 3 months at 45° C. |
| --- | --- | --- | --- | --- |
| VII | 100 | 95 | 90 | 95 |
| VIII | 100 | 100 | 100 | 100 |

The listed figures indicate the percentage ratio of the terminal voltage measured after storage for different periods to that measured immediately after production of the battery. The voltage measurements were each made after a vibration test of vibrating the battery in three directions at an amplitude of 1.0 mm. and a frequency of from 1600 to 3000 cycles per minute for 180 minutes.

As apparent from the foregoing description, the battery according to the present invention also excels any of conventional ones of the kind described in construction of the outer jacket and in the manner of terminal connection and is advantageous in that it may include an increased quantity of cell elements.

Though several embodiments of the present invention have been shown and described, it is to be understood that the present invention is never restricted to the details set forth but many changes and modifications may be made without departing from the spirit and scope of the invention as defined in the appended claims.

What is claimed is:

1. A layer-built dry battery comprising: a stack of elementary cells connected in series with each other and each including a successively overlaid arrangement of a U-shaped zinc negative electrode having rising portions along the two opposite side edges and coated over its external surface with a conductive carbon film, a separator sheet of paper and a depolarizer mix, and a heat-shrinking plastic tube covering said arrangement about its peripheral edge and heat-shrunk thereon into a U-shaped cross-sectional configuration; a terminal mounting plate carrying a positive terminal electrically connected to the positive electrode of the topmost elementary cell and a negative terminal electrically connected to the negative electrode of the lowermost elementary cell; a bottom plate held beneath said cell stack in engagement with the bottom thereof and in insulated relation to the elementary cells; and an outer jacket accommodating said cell stack and having top and bottom open edges bent to engage the periphery of said terminal mounting plate and that of said bottom plate, respectively.

2. A layer-built dry battery comprising: a stack of elementary cells connected in series with each other and each including a successively overlaid arrangement of a zinc negative electrode coated over its external surface with a conductive carbon film and U-shaped in cross section having rising portions along the two opposite side edges, a separator sheet of paper and a depolarizer mix, and a heat-shrinking plastic tube covering said arrangement about its peripheral edge and heat-shrunk thereon into a U-shaped cross-sectional configuration; a terminal mounting plate carrying a positive terminal electrically connected to the positive electrode of the topmost elementary cell and a negative terminal electrically connected to the negative electrode of the lowermost elementary cell and placed on top of the cell stack; an outer jacket having its side edges brought into abutting engagement with each other, one of the side edges carrying an inwardly offset lap positioned inside of the other side edge in overlapping relation thereto; a jacket-supporting frame embraced by the bent top edge portion of said outer jacket at least along that side thereof including said side edges brought into abutting engagement with each other and along the other two adjacent jacket sides; and a bottom plate held beneath said cell stack in engagement with the bottom thereof and in insulated relation to the elementary cells.

3. A layer-built dry battery comprising: a stack of elementary cells connected in series with each other and each including a successively overlaid arrangement of a zinc negative electrode coated over its external surface with a conductive carbon film and U-shaped in cross section having rising portions along the two opposite side edges, a separator sheet of paper and a depolarizer mix, and a heat-shrinking plastic tube covering said arrangement about its peripheral edge and heat-shrunk thereon into a U-shaped cross-sectional configuration; a positive collector assembly including a positive collector plate held in contact with the depolarizer mix of the topmost elementary cell, an insulating sheet coated on its underside with an electrically conductive metal foil, and a plastic film covering said positive collector plate and insulating sheet about their peripheral edge to form an integral assembly, said insulating sheet being partly cut out to form therein a lead-strip receiving aperture with the cutout sheet portion folded back to expose the metal foil thereon upwardly; a terminal mounting plate carrying a positive terminal held at the bottom end in contact with the exposed metal foil on the folded insulating sheet portion; a positive lead strip securely connected to said positive terminal and inserted through said lead-strip receiving aperture in said insulating sheet into the interstice between said positive collector plate and said metal foil, and a negative terminal having securely connected thereto a negative lead strip carrying projections held in contact with the carbon film of the lowermost elementary cell in said cell stack; a bottom plate held in engagement with the bottom of said cell stack and in insulating relation to the elementary cells; and an outer jacket accommodating said cell stack and having top and bottom open edges bent to engage the periphery of said terminal mounting plate and that of said bottom plate, respectively.

4. A layer-built dry battery comprising: a stack of elementary cells connected in series with each other and each including a successively overlaid arrangement of a zinc negative electrode coated over its external surface with an electrically conductive carbon film and having rising portions along the two opposite side edges, a separator sheet of paper and a depolarizer mix, and a heat-shrunk plastic tube covering said arrangement about its peripheral edge; a positive collector assembly including a positive collector plate held in contact with the depolarizer mix of the topmost elementary cell, an insulating sheet coated on its underside with an electrically conductive metal foil, and a plastic film covering said positive collector plate and insulating sheet about their peripheral edge to form an integral assembly said insulating sheet and metal foil being partly cutout to form therein a lead-strip receiving aperture with the cutout sheet portion folded back to expose the metal foil thereon upwardly; a terminal mounting plate carrying a positive terminal held at the bottom end in contact with the exposed metal foil on the folded insulating sheet portion, a positive lead strip securely connected to said positive terminal and inserted through said lead-strip receiving aperture in said insulating sheet into the interstice between said positive collector plate and said metal foil, and a negative terminal having securely connected thereto a negative lead strip carrying projections held in contact with the carbon film of the lowermost elementary cell in the cell stack; an outer jacket having its side edges brought into abutting engagement with each other, one of the side edges carrying an inwardly offset lap positioned inside of the other side edge in overlapping relation thereto; a jacket-supporting frame embraced by the bent top edge portion of said outer jacket at least along that side thereof including said side edges brought into abutting engagement with each other and along the other two adjacent jacket sides; and a bottom plate held beneath said cell stack in engagement with the bottom thereof and in insulated relation to the elementary cells and having along the peripheral edge a flanged formation embraced by the bent bottom edge portion of said outer jacket.

5. A layer-built dry battery as claimed in claim 1, in which said zinc negative electrode coated over its external surface with an electrically conductive carbon film includes a generally rectangular body portion having four arcuate corners and rising portions formed along two opposite side edges of said body portion except at the arcuate ends thereof.

6. A layer-built dry battery as claimed in claim 2 in which said jacket-supporting frame includes a steel wire bent into a closed generally rectangular formation.

7. A layer-built dry battery as claimed in claim 2 in which said jacket-supporting frame includes a steel wire bent into a U-form.

8. A layer-built dry battery as claimed in claim 2 in which said jacket-supporting frame includes a peripheral flange formed on said terminal mounting plate.

9. A layer-built dry battery as claimed in claim 2 in which said jacket-supporting frame includes projections extending from the peripheral edge portion of said terminal mounting plate.

10. A layer-built dry battery as claimed in claim 2 in which said bottom plate includes a downwardly extending peripheral flange formation embraced by the bent bottom edge portion of said outer jacket and a recessed top surface with an insulator plate fittingly received therein and adhesively secured to the negative lead strip on its side opposite to that carrying projections.

References Cited

UNITED STATES PATENTS

| | | | |
|---|---|---|---|
| 2,505,835 | 5/1950 | Richardson et al. | 136—111 |
| 2,521,800 | 9/1950 | Martinez et al. | 136—111 |
| 2,526,789 | 10/1950 | Woodring | 136—111 |
| 2,536,697 | 1/1951 | Ruben | 136—111 |
| 2,658,936 | 11/1953 | Rock | 136—111 |
| 2,774,806 | 12/1956 | Jobe et al. | 136—111 |
| 3,347,709 | 10/1967 | Taylor et al. | 136—108 |
| 3,370,298 | 2/1968 | Balaguer | 136—100 |

ALLEN B. CURTIS, *Primary Examiner.*

A. SKAPARS, *Assistant Examiner.*

U.S. Cl. X.R.

136—111, 175